United States Patent Office 3,042,688
Patented July 3, 1962

3,042,688
PROCESS FOR THE PRODUCTION OF 6-METHYL-3-KETO-Δ$^{4,6}$-STEROID COMPOUNDS
Bruno Camerino, Milan, and Bianca Patelli, Stradella, Italy, assignors to Società Farmaceutici Italia, Milan, Italy, a corporation of Italy
No Drawing. Filed Nov. 16, 1960, Ser. No. 69,550
Claims priority, application Italy Nov. 20, 1959
6 Claims. (Cl. 260—397.3)

The invention relates to a process for the production of 6-methyl-3-keto-Δ$^{4,6}$-steroid compounds. It particularly concerns a process for the production of 6-methyl-3-keto-Δ$^{4,6}$-pregnadienes having the general formula:

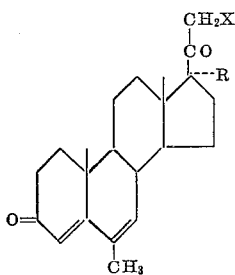

wherein

R=H, OH, OR'.
R'=acyl radical of a carboxylic acid having not more than 9 carbon atoms (such as acetyl, propionyl, valeryl, hexanoyl, cyclopentanepropionyl, cyclohexaneacetyl, benzoyl or phenylpropionyl).
X=H, F.

It is known, note U.S. patent specification 2,891,079, that compounds having the above general formula show high progestative activity comparable to that of their analogues that are without the double bond in the 6-7 position of the steroid ring, such as the well known 17-esters of 6α-methyl-17α-hydroxy-progesterone. Besides this, they have outstanding specific advantages without the collateral toxic side effects. They are useful in the following clinical treatments: amenorrhea, dysmenorrhea, sterility, menorrhagia, metrorrhagia. In the veterinary field the products are particularly useful for the following conditions: absolute or relative hypoluteinismus, hyperfolliculismus, nymphomania, irregular or frequent ardors, sterility without apparent causal reasons after immoderate ardors and as coadjutors in the prophylaxis of the infective abortion from Brucella and in the abortion from vibro foetus.

The preparation of products having the above general formula, according to the above U.S. patent, is carried out by treating the corresponding steroid, without the double bond in 6-7 position, with chloranil in an organic solvent, such as an aromatic hydrocarbon, in the presence of p.toluenesulphonic acid.

In the literature, several other processes are described for the preparation of 3-keto-Δ$^{4,6}$-steriods. The most important are as follows:

(a) From 3-hydroxy-Δ$^5$-steroids, by reaction with a quinone in the presence of an aluminum, zinc or magnesium alcoholate or phenolate (U.S. Patent 2,311,102).

(b) From 6-bromo-steroids, obtained from the corresponding 3-keto-Δ$^4$-steroids with N-bromo-acetamide, by dehydrobromination with amines (U.S. Patent 2,332,815) or by transformation into 6-acetoxy-steroids and subsequent hydrolysis (U.S. Patent 2,816,902).

(c) From 3-keto-Δ$^4$-steroids, by reaction with manganese dioxide in an organic solvent (U.S. Patent 2,739,974).

(d) From 3-keto-Δ$^4$-steroids, by fermentation to give the 6-hydroxy derivatives and subsequent dehydration (U.S. Patent 2,670,357).

We have discovered a new and advantageous process for the preparation of 6-methyl-3-keto-steroids, which is characterized by the use of cheap reagents, simple reactions and high yields.

The invention provides a process for the production of a 6-methyl-3-keto-Δ$^{4,6}$-steroid compound which comprises the treatment of the corresponding 4α,5- and/or 4β,5-epoxide with concentrated sulphuric acid in acetic acid, the initial epoxy compound being preferably prepared by the treatment of the corresponding Δ$^4$-steroid compound with alkaline hydrogen peroxide.

The process of the invention may be illustrated as follows:

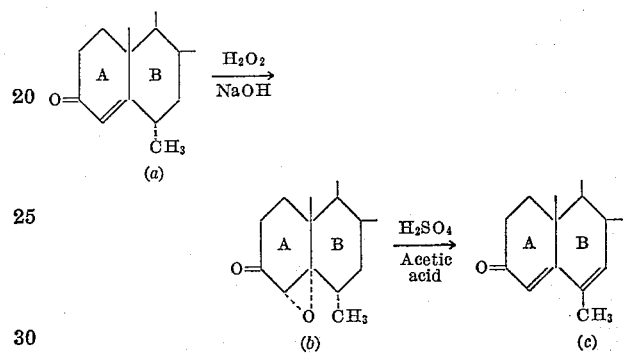

A 6α-methyl-3-keto-Δ$^4$-steroid (a), dissolved in an organic, preferably a water miscible solvent, such as methanol or ethanol reacts with hydrogen peroxide under alkaline conditions to give the corresponding 6α-methyl-3-keto-4,5-epoxide (b) (β and α forms), from which by reaction with concentrated sulphuric acid in anhydrous acetic acid the corresponding 6-methyl-3-keto-Δ$^{4,6}$-steroid (c) is obtained.

It is known (B. Camerino et al. (1956), J. Am. Chem. Soc. 78, p. 3540) that 3-keto-4,5-epoxy-steroids react with sulphuric acid in acetic acid to give 4-hydroxy-3-keto-Δ$^4$-steroids, but it is completely unexpected that the same reaction condition should convert a 6α-methyl-3-keto-4,5-epoxy-steroid into a 6-methyl-3-keto-Δ$^{4,6}$-steroid.

6α-methyl-progesterone or the analogous 17α-hydroxy, 17α-acyloxy or 21-fluoro body dissolved in methanol is allowed to react with 35% hydrogen peroxide and aqueous sodium hydroxide at room temperature, until the ultraviolet absorption bands, due to the 3-keto-Δ$^4$ group, disappear. The reaction mixture is poured into salty water and a mixture of 4α,5- and 4β,5-epoxides is recovered either by filtration or by extraction with an organic solvent such as chloroform, methylene chloride or ethyl acetate. The resulting mixture of epoxides is dissolved in acetic acid, concentrated sulphuric acid is added and the whole is allowed to react for 10–20 hours at room temperature. The solution is then diluted with ice-water and the steroid extracted preferably with an organic solvent such as chloroform, methylene chloride or ethyl acetate. The crude product is purified by crystallization from organic solvents.

According to the invention, Δ$^6$-dehydro-6-methyl-17α-acetoxy-progesterone has been prepared from 6α-methyl-17α-acetoxy progesterone, Δ$^6$-dehydro-6-methyl-progesterone from 6α-methyl-progesterone, Δ$^6$-dehydro-6-methyl-17α-hydroxy-progesterone from 6α-methyl-17α-hydroxy-progesterone, Δ$^6$-dehydro-6-methyl-17α-hydroxy-progesterone caproate from 6α-methyl-17α-hydroxy-progesterone caproate and Δ$^6$-dehydro-6-methyl-21-fluoro-17α-acetoxy-progesterone from 6α-methyl-21-fluoro-17α-acetoxy-progesterone.

The process of the present invention may also be used for the preparation of 6-methyl-3-keto-Δ⁴,⁶-steroids of the androstane series.

The process of the invention is illustrated in detail by the following examples:

EXAMPLE 1

Δ⁶-Dehydro - 6 - Methyl - 17α - Acetoxy-Progesterone —R=OCOCH₃; X=H in the General Formula 2.2 gm. of 6α-methyl-17α-acetoxy-progesterone were dissolved in 120 ml. of methanol and the resulting solution was cooled to 15° C., 4 ml. 4 N sodium hydroxide and 7 ml. of 35% hydrogen peroxide being then added. The mixture was kept at about 0° C. for 1 hour and at room temperature for 1.5 hours. 1 ml. of acetic acid was added, the solution was poured into salty water and the steroid extracted with methylene chloride. The extract was washed with 10% aqueous sodium bicarbonate and fiinally with water. After removing the solvent 2.2 gm. of a crystalline residue melting at 190–193° C. was obtained. This was a mixture of 4α,5- and 4β,5-epoxy-6α-methyl-17α-acetoxy-progesterone.

1 ml. of concentrated sulphuric acid was added to a solution of 2 gm. of the above mixture in 8 ml. of acetic acid and the solution was allowed to stand for a night at room temperature. After the addition of ice-water, the steroid was extracted with ethyl acetate. The extract was washed with 10% aqueous sodium bicarbonate and then with water. After evaporation of the solvent, 2 gm. of a crystalline residue was obtained, which contained about 60% Δ⁶-dehydro-6-methyl-17α-acetoxy-progesterone, estimated by its ultraviolet absorption.

By crystallization from acetone-petroleum ether the pure product (M.P.=215–217° C.; λ_max at 289 mμ; ε=22,500) was obtained.

EXAMPLE 2

Δ⁶-Dehydro - 6 - Methyl-Progesterone—R=X=H in the General Formula

By carrying out the same process as described in Example 1 on 6α-methyl-progesterone as starting material, Δ⁶-dehydro-6-methyl-progesterone melting at 154–156° C. (λ_max at 289 mμ; ε=24,100) was obtained.

EXAMPLE 3

Δ⁶-Dehydro - 6 - Methyl - 17α - Hydroxy-Progesterone —R=OH; X=H in the General Formula By carrying out the same process as described in Example 1 on 6α-methyl-17α-hydroxy-progesterone as starting material, Δ⁶-dehydro-6-methyl-17α-hydroxy-progesterone melting at 208–210° C. (λ_max at 288 mμ; ε=23,500) was obtained.

EXAMPLE 4

Δ⁶-Dehydro - 6 - Methyl - 17α - Hydroxy-Progesterone Caproate—R=OCO(CH₂)₄CH₃; X=H in the General Formula By carrying out the same process as described in Example 1 on 6α-methyl-17α-hydroxy-progesterone caproate as starting material, Δ⁶-dehydro-6-methyl-17α-hydroxy-progesterone caproate, melting at 120° C. (λ_max at 289 mμ; ε=23,500) was obtained.

EXAMPLE 5

Δ⁶-Dehydro - 6 - Methyl - 21 - Fluoro - 17α - Acetoxy-Progesterone—R=OCOCH₃; X=F in the General Formula By carrying out the same process as described in Example 1 on 6α-methyl-21-fluoro-17α-acetoxy-progesterone (described by C. G. Bergstrom et al. in Journal of American Chemical Society, vol. 82, pages 2322–2327, May 5, 1960) as starting material, Δ⁶-dehydro-6-methyl-21-fluoro-17α-acetoxy-progesterone, melting at 222–223° C. (λ_max at 289 mμ; ε=23,800) was obtained.

We claim:
1. A process for making a steroid compound of the general formula:

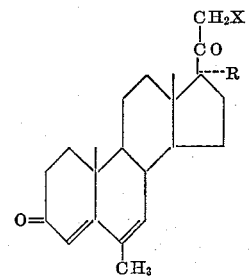

wherein R is taken from the class consisting of H, OH, OR', R' is an acyl radical of a carboxylic acid having not more than 9 carbon atoms, and X is taken from the class consisting of H and F, which comprises treating the corresponding 4,5-epoxide with concentrated sulphuric acid in acetic acid, said epoxide being taken from the group consisting of the 4α,5- and 4β,5-epoxides.

2. A process for making the steroid compound Δ⁶-dehydro-6-methyl - 17α - acetoxy-progesterone, which comprises treating the corresponding 4,5-epoxide with concentrated sulphuric acid in acetic acid, said epoxide being taken from the group consisting of 4α,5- and 4β,5-epoxides.

3. A process for making the steroid compound Δ⁶-dehydro-6-methyl-progesterone, which comprises treating the corresponding 4,5-epoxide with concentrated sulphuric acid in acetic acid, said epoxide being taken from the group consisting of 4α,5- and 4β,5-epoxides.

4. A process for making the steroid compound Δ⁶-dehydro-6-methyl - 17α - hydroxy-progesterone, which comprises treating the corresponding 4,5-epoxide with concentrated sulphuric acid in acetic acid, said epoxide being taken from the group consisting of 4α,5- and 4β,5-epoxides.

5. A process for making the steroid compound Δ⁶-dehydro-6-methyl-17α-hydroxy-progesterone caproate, which comprises treating the corresponding 4,5-epoxide with concentrated sulphuric acid in acetic acid, said epoxide being taken from the group consisting of 4α,5- and 4β,5-epoxides.

6. A process for making the steroid compound Δ⁶-dehydro-6-methyl-21-fluoro-17α-acetoxy-progesterone which comprises treating the corresponding 4,5-epoxide with concentrated sulfuric acid in acetic acid, said peroxide being taken from the group consisting of 4α,5- and 4β,5-epoxides.

References Cited in the file of this patent
UNITED STATES PATENTS
2,891,079    Dodson et al. _____ Jan. 23, 1959